US008392642B2

(12) United States Patent  
Ageishi

(10) Patent No.: US 8,392,642 B2  
(45) Date of Patent: Mar. 5, 2013

(54) TIMEOUT PREVENTING DEVICE, A TIMEOUT PREVENTING METHOD AND A PROGRAM THEREOF

(75) Inventor: Daisuke Ageishi, Tokyo (JP)

(73) Assignee: NEC Corporation, Tokyo (JP)

(*) Notice: Subject to any disclaimer, the term of this patent is extended or adjusted under 35 U.S.C. 154(b) by 345 days.

(21) Appl. No.: 12/898,315

(22) Filed: Oct. 5, 2010

(65) Prior Publication Data

US 2011/0082959 A1 Apr. 7, 2011

(30) Foreign Application Priority Data

Oct. 6, 2009 (JP) ................................. 2009-232457

(51) Int. Cl.
*G06F 13/24* (2006.01)
(52) U.S. Cl. ........... 710/263; 710/240; 710/200; 714/23
(58) Field of Classification Search .......... 710/240–244, 710/260; 714/23
See application file for complete search history.

(56) References Cited

U.S. PATENT DOCUMENTS

| 5,991,896 A | * | 11/1999 | Cho .................................. 714/23 |
| 6,714,996 B1 | * | 3/2004 | Kobayashi ........................ 710/5 |
| 7,711,869 B1 | * | 5/2010 | Strickland et al. .............. 710/15 |
| 2005/0172169 A1 | * | 8/2005 | Sekiguchi et al. .............. 714/31 |

FOREIGN PATENT DOCUMENTS

| JP | 01-239567 | * | 9/1989 |
| JP | 03-102430 A | | 4/1991 |
| JP | 2004-046599 | * | 12/2002 |
| JP | 2004-046599 A | | 2/2004 |

* cited by examiner

*Primary Examiner* — Brian Misiura  
*Assistant Examiner* — Kim Huynh  
(74) *Attorney, Agent, or Firm* — Sughrue Mion, PLLC

(57) ABSTRACT

Preventing time out of an IO transaction during CPU re-initialization by controlling the IO transaction so that the time when the IO transaction is continuously stopped during the CPU re-initialization process is within a predetermined time that prevents complete time out of an interrupt of an IO transaction. In a case where the IO transaction would be continuously stopped for greater than the predetermined time during a CPU re-initialization the IO transaction is stopped and restarted within the predetermined time. The status of the interrupt during such stopping and starting is stored so as not to loose the interrupt status during the interval between such stopping and starting.

32 Claims, 9 Drawing Sheets

TIMEOUT PREVENTING DEVICE, A TIMEOUT PREVENTING METHOD AND A PROGRAM THEREOF

This application is based upon and claims the benefit of priority from Japanese patent application No. 2009-232457, filed on Oct. 6, 2010, the disclosure of which is incorporated herein in its entirety by reference.

BACKGROUND

The present invention relates to a timeout preventing device, a timeout preventing method and a program thereof. More particularly, it relates to a method for preventing a timeout which may occur in reinitialization of CPU (Central Processing Unit).

Generally, as a technique for enhancing the reliability of a calculation result, it is known that a plurality of modules each having an arithmetic processing unit executes the same arithmetic processing and the calculation result is used.

As one example of such technique, Patent Document 1 discloses a technique using a fault-tolerant computer system. In the technique disclosed in Patent Document 1, the fault-tolerant computer system is configured to include a plurality of computing modules 100 and 200. Each of the computing modules 100 and 200 processes the same instruction sequence in synchronism with clocks, and compares the processing results of the respective computing modules with each other so as to continue processing by the other computing module even if one computing module is in failure.

Also, as one of techniques using the plurality of computation results, a technique called CLL (core level lockstep) is known.

The CLL is a technique in which two cores execute the same processing, and compare the calculation results with each other to enhance the reliability. A state in which two cores execute the same processing and compare the calculation results with each other is called "lockstep mode". When the calculation results are corresponding with each other during the lockstep mode, a failure of the CPU is indicated as a non-recoverable failure. Also, there is a possibility that a failure occurs in each core other than the calculation result corresponding failure during the lockstep mode. When a recoverable failure occurs in each core, the lockstep mode is temporarily canceled (this cancellation is also called "LoL (loss of lockstep)"), resulting in "non-lockstep mode" which is a state in which the calculation results cannot be compared with each other.

When the state gets into the non-lockstep mode, a BIOS has to again get a state of a processor into the lockstep mode. This operation is called "LoL recovery". The CPU is required to be again reset for the LoL recovery. Temporarily, in the BIOS, a process for stopping transaction between the CPU and IO (Hereinafter, the transaction is appropriately represented as "Txn". Also, the transaction between the CPU and the IO is represented as "IO Txn") is required. This is to prevent IO interrupt for a processor in condition of "LOL" from being lost when CPU is reset again.

(Like this, it is possible to prevent the IO interrupt from being lost by stopping transaction between the CPU and the IO.

For example, Patent Document 2 discloses a technique regarding the IO interrupt on the page 2, line 7 from left below to page 3 to line 9 from right below.
[Patent Document 1] JP-A-2004-046599
[Patent Document 2] JP-A-HEI3-102430

However, the above-mentioned technique in which transaction between the CPU and the IO is stopped suffers from the following problem.

The problem is that when the IO Txn stop time is long, a completion timeout occurs in a PCI Express Card, resulting in the possibility that the system fails. This problem will be described in detail below.

The CLL is a technique in which two cores execute the same processing, and compare the calculation results with each other to enhance the reliability. When a failure occurs in each core, it is necessary to reset the CPU in order to reenter the lockstep mode. As described above, in the general CPU reset portion, in order to prevent the interrupt of IO from being lost during resetting of the CPU, the IO Txn stops. However, there arises such a problem that when the IO Txn stop time becomes longer, the PCI Express Card results in completion timeout. The completion timeout is defined as default 50 ms on the specification of the PCI Express. In most of PCI Express Cards of the GEN1 generation, the completion timeout time cannot be changed. For that reason, in order to prevent the completion timeout, there is a need to prevent the Txn stop time from exceeding 50 ms.

FIG. 4 shows a general LoL recovery flow. Before the CPU is reset (B603), context saving (B602) is implemented in order to save the present condition, and after the CPU has been reset, context restoration (B604) is executed in order to restore the condition to the condition before the CPU is reset. When interrupt from the IO is generated between B602 and B604, the interrupt is lost. Therefore, the IO transaction stop (B601) and the IO transaction start (B605) are conducted. There arises such a problem that a processing time from 3601 to B605 exceeds 50 ms, resulting in the default completion timeout of the PCI Express Card.

Therefore, an object of the present invention is to provide a preventing timeout device, a preventing timeout method and a preventing timeout program which are capable of preventing the timeout that may occur in reinitialization of the CPU with again resetting the CPU.

SUMMARY OF THE INVENTION

According to a non-limiting illustrative embodiment, a timeout preventing device for preventing time out of an IO transaction during CPU re-initialization comprises IO transaction control unit configured to stop and start an IO (Input/Output) transaction; context saving unit configured to save a register condition of a CPU; CPU resetting unit configured to reset the CPU after the context saving unit saves the register condition of the CPU; and context restoring unit configured to restore the register condition of the CPU to the condition saved by the context saving unit after the CPU resetting unit resets the CPU, wherein the IO transaction control unit controls the IO transaction so that the time when the IO transaction is continuously stopped during the CPU re-initialization process is within a predetermined time that prevents complete time out of an interrupt during an IO transaction.

According to another non-limiting illustrative embodiment, a timeout preventing method for preventing timeout of an IO transaction during CPU re-initialization comprises: saving a register condition of the CPU in a context saving step; resetting the CPU after the context saving step; restoring the register condition of the CPU saved in the context saving step controlling the stopping and starting of the IO transaction so that the time during the CPU re-initialization when the IO transaction is continuously stopped before being restarted is within a predetermined time such that complete timeout of an interrupt of the IO transaction is prevented.

According to still another non-limiting illustrative embodiment, a computer readable medium has recorded thereon a program for enabling a computer to execute a timeout preventing method to prevent an IO transaction from timing out during a re-initialization of the CPU of the computer, comprising: saving a register condition of a CPU in a context saving step; stopping an IO transaction when the CPU is in re-initialization; resetting the CPU after the context saving step; and restoring the register condition of the CPU saved in the context saving step after the CPU resetting step, controlling the IO transaction so that the time when the IO transaction is continuously stopped during CPU re-initialization is within a predetermined time such that complete timeout of an interrupt of the IO transaction is prevented.

According to another non-limiting illustrative embodiment, a timeout preventing device for preventing an IO transact during CPU re-initialization comprises: IO transaction control means for stopping and starting an IO (Input/Output) transaction; context saving means for saving a register condition of a CPU; CPU resetting means for resting the CPU during re-initialization after the context saving means saves the register condition of the CPU; and context restoring means for restoring the register condition of the CPU to the condition saved by the context saving unit after the CPU resetting means resets the CPU, wherein the IO transaction control means controls the IO transaction so that the time when the IO transaction is continuously stopped during the CPU re-initialization process is within a predetermined time that prevents complete time out of an interrupt of an IO transaction such that the interrupt is not lost during CPU re-initialization.

BRIEF DESCRIPTION OF THE DRAWINGS

Other features and advantages of various embodiments of the present invention will become apparent by the following detailed description and the accompanying drawings, wherein.

DETAILED DESCRIPTION

A first exemplary embodiment of the present invention will be described in detail below.

First, an outline of an embodiment of the present invention will be described. In a case where an extended function provided by a CPU such as a CLL is disabled by a CPU internal error or the like, there is a need to again reset the CPU in order to again enable the function. In this embodiment of the present invention, roughly, IO stop in reinitialization of the CPU with again resetting the CPU is divided to enable the extended function without IO timeout.

Next, this embodiment of the present invention will be described in detail with reference to the drawings.

Figure 1:
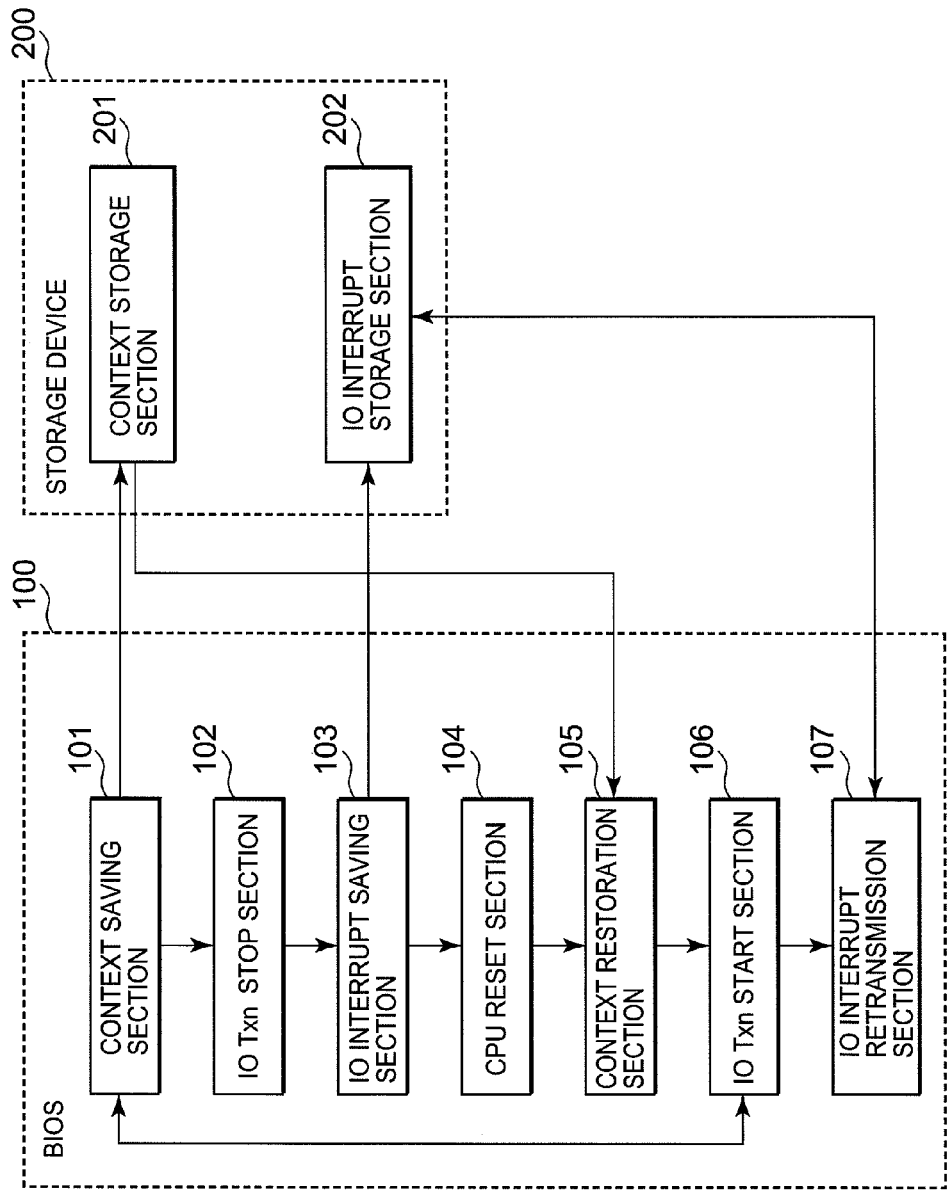
FIG. 1 is a diagram indicating a basic configuration in a first exemplary embodiment of the invention.

Referring to FIG. 1, this embodiment includes a BIOS (basic input/output system) 100 and a storage device 200.

The BIOS 100 includes a context saving unit such as a context saving section 101, an IO transaction control unit such as an IO Txn stop section 102 and IO Txn start section 106, an IO interrupt saving unit such as an IO interrupt saving section 103, an CPU reset unit such as a CPU reset section 104, a context restoration unit such as a context restoration section 105, and an IO interrupt retransmission unit such as an IO interrupt retransmission section 107.

The context restoration section 101 is a portion that stores the condition of a register of a processor in a context storage section 201. The IO Txn stop section 102 is a portion that stops the IO Txn. The IO interrupt saving section 103 is a portion that saves an IO interrupt condition in a CPU reset flow in an IO interrupt storage section 202. The CPU reset section 104 is a portion that resets the interior of the CPU. The context restoration section 105 reads the condition of the register in the processor, which is stored in the context storage section 201, and restores the context. The IO Txn start section 106 is a portion that starts the IO Txn. The IO interrupt retransmission section 107 is a portion that retransmits the IO interrupt condition in the CPU reset flow, which is saved in the IO interrupt storage section 202.

Also, the storage device 200 includes the context storage section 201 and the IO interrupt storage section 202.

The context storage section 201 is a portion that records the condition of the register in the processor. On the other hand, the IO interrupt storage section 202 is a portion that saves the interrupt condition in the CPU reset flow.

The operation of this embodiment will be described in detail below with reference to a block diagram of FIG. 1 and a flowchart of FIG. 2.

The BIOS 100 starts an LoL recovery when LoL occurs.

First, the context saving section 101 saves the register condition of the processor (CPU) in the context storage section 201 (Step A501).

The IO Txn stop section 102 executes a first IO Txn stop. In FIG. 2, this operation is represented as a first IO transaction stop (Step A502).

Then, the IO interrupt saving section 103 saves the IO interrupt condition in the IO interrupt storage section 202 (Step A503). The reason is that the IO interrupt in the register of the CPU might be reset when the CPU is reset.

After the IO interrupt storage section 202 has recorded the IO interrupt condition due to saving in Step S503, the CPU reset section 104 resets the CPU (Step A504).

The IO Txn start section 106 starts the IO Txn. In FIG. 2, this operation is represented as a first IO transaction start (Step A505).

The IO Txn stop section 102 again stops the IO Txn. In FIG. 2, this operation is represented as a second IO transaction stop (Step A506).

Then, the IO interrupt saving section 103 saves the IO interrupt condition in the IO interrupt storage section 202 (Step A507). The reason is that a part of the IO interrupt in register of the CPU might be lost when the context is restored The context restoration section 105 restores the context based on the register condition of the processor which is recorded by the context storage section 201 (Step A508).

The IO Txn start section 105 starts the IO Txn. In FIG. 2, this operation is represented as a first IO transaction start (Step A509).

The IO interrupt saving section 103 saves the IO interrupt condition in the IO interrupt storage section 202 (Step A510) in order to calculate a lost IO interrupt should one occur.

The IO interrupt retransmission section 107 retransmits a lost IO interrupt.

Following is how to calculate the lost IO interrupt. Because the IO interrupt in step A510 is the IO interrupt stored in the register of the CPU now, it is not necessary for the IO interrupt transmission section 107 to retransmit it as a lost IO interrupt. On the other hand, the IO interrupt in step A503 and step A507 might be lost. As a result, the interrupt to be retransmitted is (interrupt condition stored in Step A503) or (interrupt condition stored in Step A507) xor (interrupt condition stored in Step A510) (Step A511).

That is, the IO interrupt that is included in the IO interrupt condition stored in Step A503 or Step A507, but not included in the IO interrupt condition stored in Step A510 is retransmitted as a lost one. On the other hand, the IO interrupt that is included in the IO interrupt condition stored in step A503 or Step A507, and also included in the IO interrupt condition stored in Step A510 is not retransmitted because the IO interrupt has not been lost.

The above-described embodiment of the present invention has the following advantages.

A first advantage of the first exemplary embodiment of the present invention is that the CPU can be reset without IO timeout.

Figure 4:
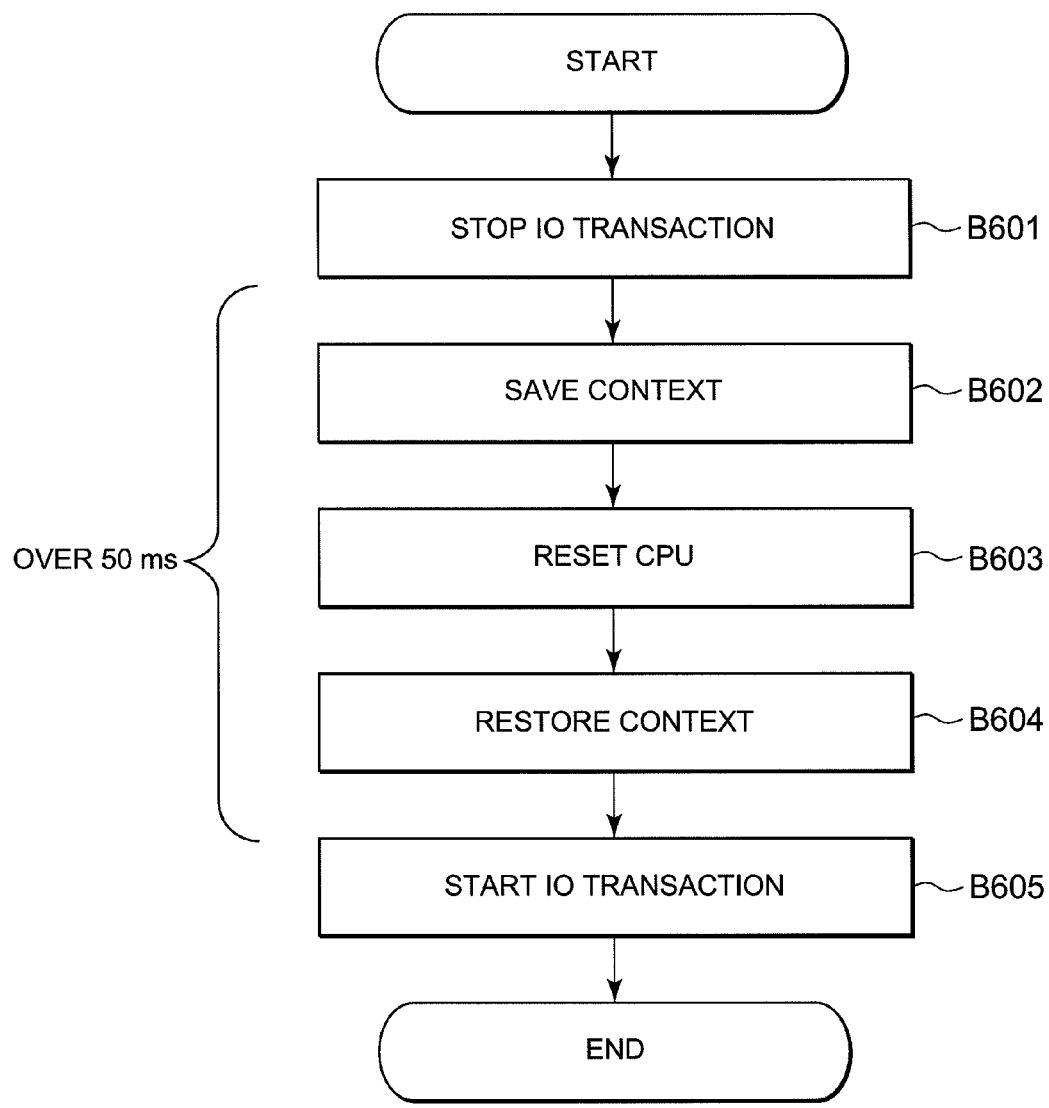
FIG. 4 is a diagram indicating the operation of an invention relevant to the present invention.

As described above, in the general technique, as shown in FIG. 4, the context saving, the CPU reset, and the context restoration are executed while stopping the IO Txn, and the IO transaction stop interval is long. However, in this embodiment, since the IO Txn stop interval is divided, the CPU can be reset without IO timeout.

A second advantage of the first exemplary embodiment of the present invention is that the interrupt can be prevented from being lost.

The reason is that the IO interrupt condition is stored during the CPU reset flow, and the interrupt is retransmitted with the results. As the result, even if the interrupt condition of the interrupt is initialized on reinitialization of the CPU, the interrupt is not lost.

Figure 3:
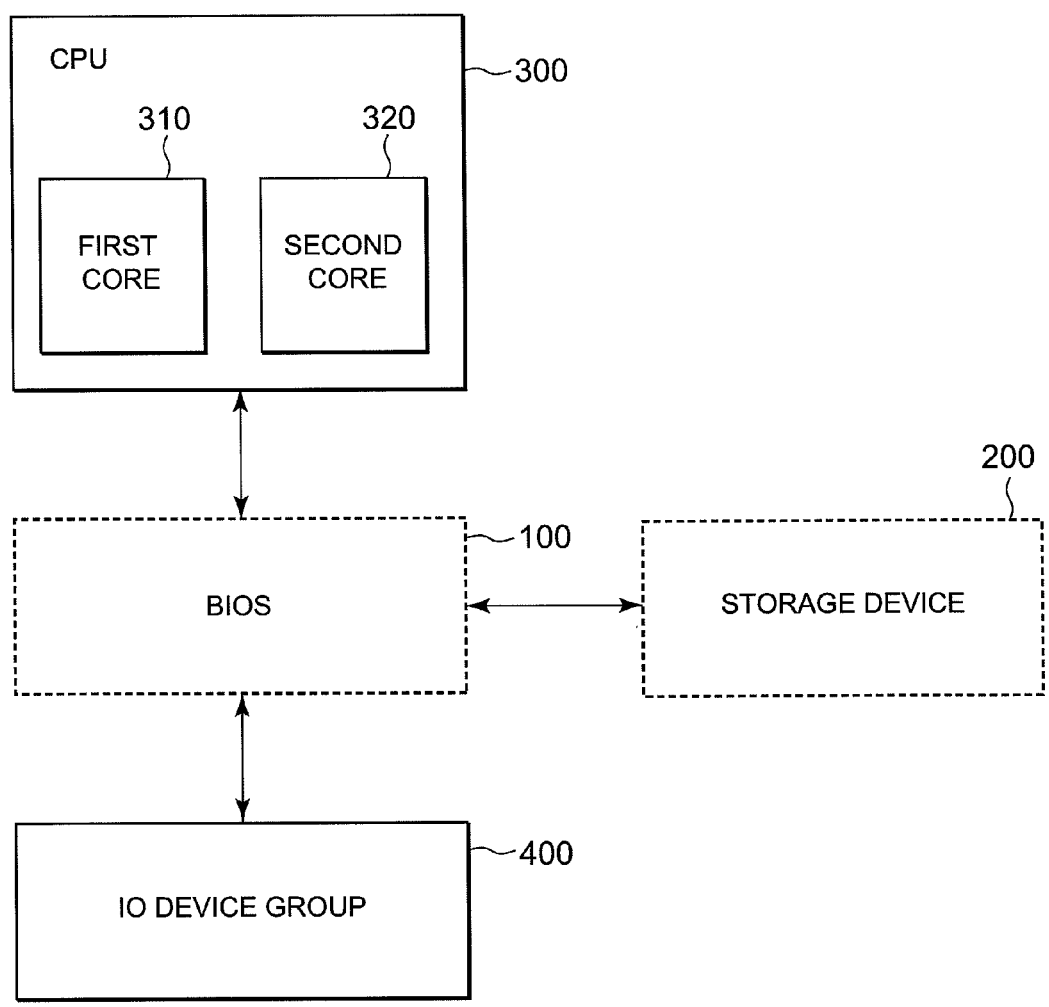
FIG. 3 is a diagram indicating a basic configuration of an implementation example.

The installation example of this embodiment will be described below with reference to FIG. 3. This embodiment includes a CPU 300 and an IO device group 400 in addition to the BIOS 100 and the storage device 200. Further, the CPU 300 has a first core 310 and a second core 320.

Then, the first core 310 and the second core 320 execute the same processing to realize a CLL. On the other hand, the IO interrupt is conducted from the IO device group 400.

The operation of the BIOS 100 and the storage device 200 are described above with reference to FIGS. 1 and 2. Also, since the internal configurations of the BIOS 100 and the storage device 200 are identical with those in FIG. 1, the respective parts will be omitted from the description and the drawings.

The timeout preventing device in reinitialization of the CPU with again resetting the CPU according to this embodiment of the present invention can be realized by hardware. Alternatively, the timeout preventing device can be also realized by reading a program causing a computer to be functioned as the timeout preventing device in reinitialization of the CPU with again resetting the CPU from a computer readable recording medium, and executing the program by the computer.

Also, the flow of the present invention is not limited to first exemplary embodiment. Following is a modified exemplary embodiment of the first exemplary embodiment.

For example, the IO transaction control unit such as the IO Txn stop section 102 and the IO Txn start section 106 determines the interval of the IO transaction stop time based on the time necessary for the context saving, the CPU reset and the context restoration. In this case, the context saving section 101 sends information necessary for the context saving to the IO transaction control unit. And the CPU reset section 104 sends information necessary for the CPU reset to the IO transaction control unit. And the context restoration section 105 sends information necessary for the context restoration to IO transaction control unit.

Figure 5:
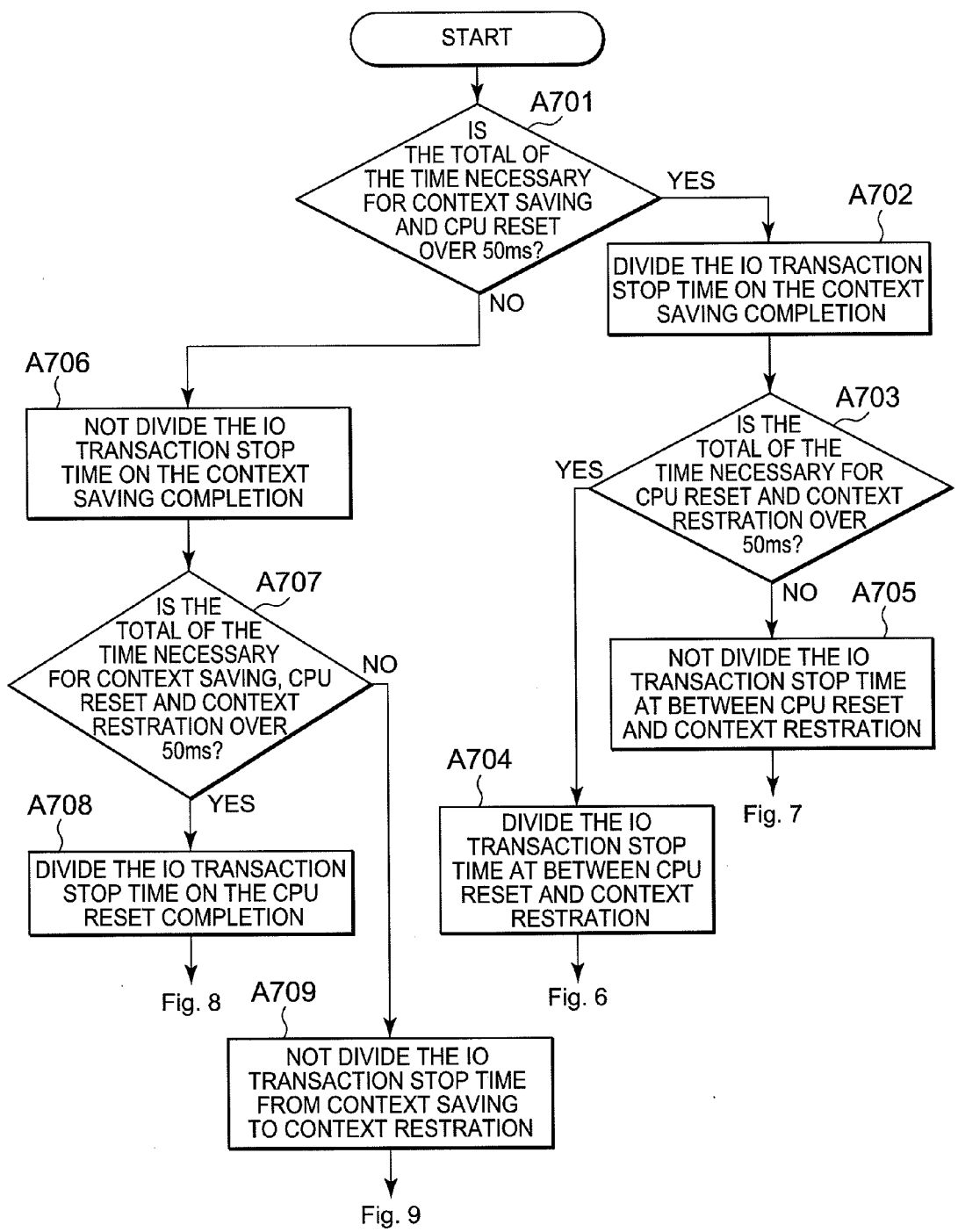
FIG. 5 is a flowchart indicating how an IO transaction control unit determines the interval of the IO transaction stop time in the modified exemplary embodiment of the first exemplary embodiment.

FIG. 5 is a flowchart indicating how the IO transaction control unit determines the interval of the IO transaction stop time in this modified exemplary embodiment.

First, the IO transaction control unit determines whether the total of time necessary for context saving and CPU reset is over the completion timeout time of the PCI Express cards (50 ms) or not. In step A701, if the total is over 50 ms, the IO transaction control unit determines that the IO transaction stop time is divided on the context saving completion (step A702). Next, the IO transaction control unit determines whether the total of the time necessary for the CPU reset and the context restoration is over the completion timeout time of the PCI Express cards (50 ms) or not (step A703). In step A703, if the total is over 50 ms, the IO transaction control unit determines that the IO transaction stop time is divided at between the CPU reset and the context restoration (step A704). On the other hand, in the step A703, if the total is not over 50 ms, the IO transaction control unit determines that the IO transaction stop time is not divided at between the CPU reset and the context restoration (step A705).

On the other hand, in the step A701, if the total is not over 50 ms, the IO transaction control unit determines that the IO transaction stop time is not divided on the context saving completion (step A706). And the IO transaction control unit determines whether the total of the time necessary for the context saving, the CPU reset and the context restoration is over 50 ms or not (step A707). In the step A707, if the total is over 50 ms, the IO transaction control unit determines that the IO transaction stop time is divided on the CPU reset completion (step A708). On the other hand, in the step A707, if the total is not 50 ms, the IO transaction control unit determines that the context saving, the CPU reset and the context restoration is continuously done without the IO transaction stop time being divided (step A709).

Figure 6:
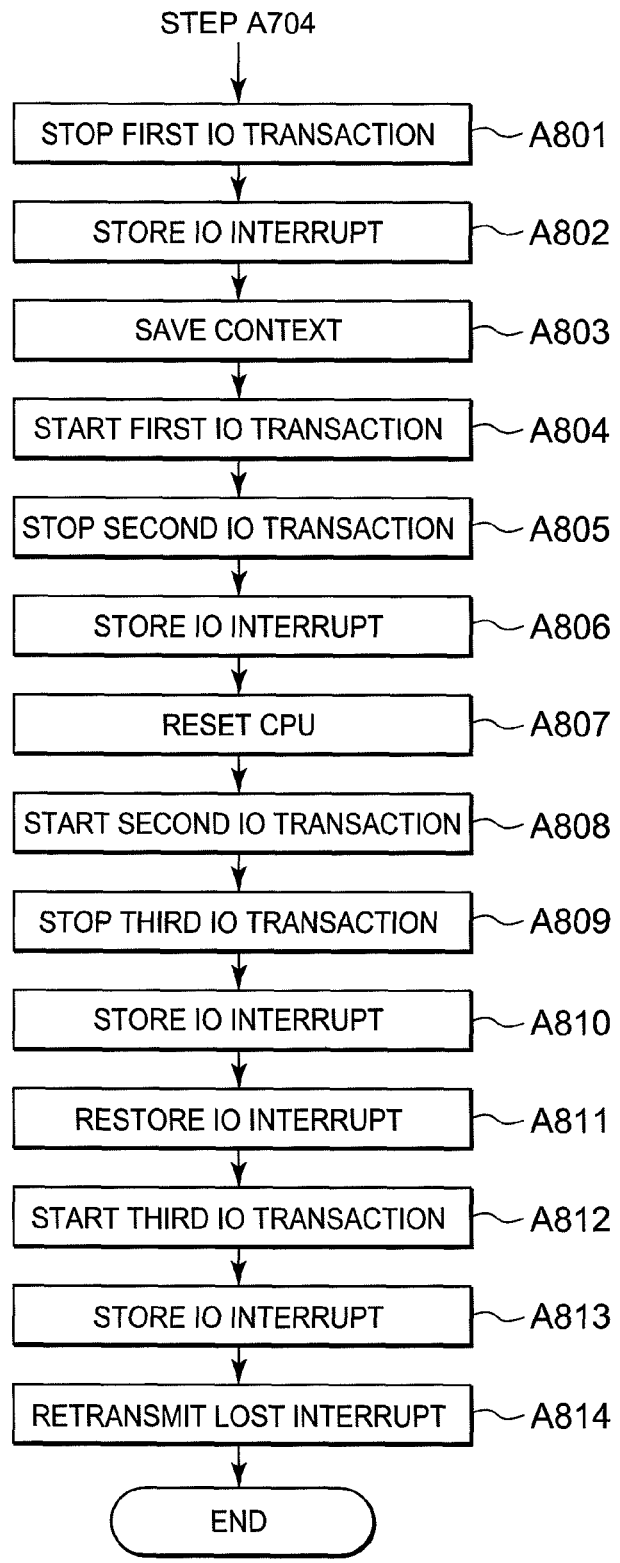
FIG. 6 is a diagram indicating the continuation of FIG. 5.
Figure 7:
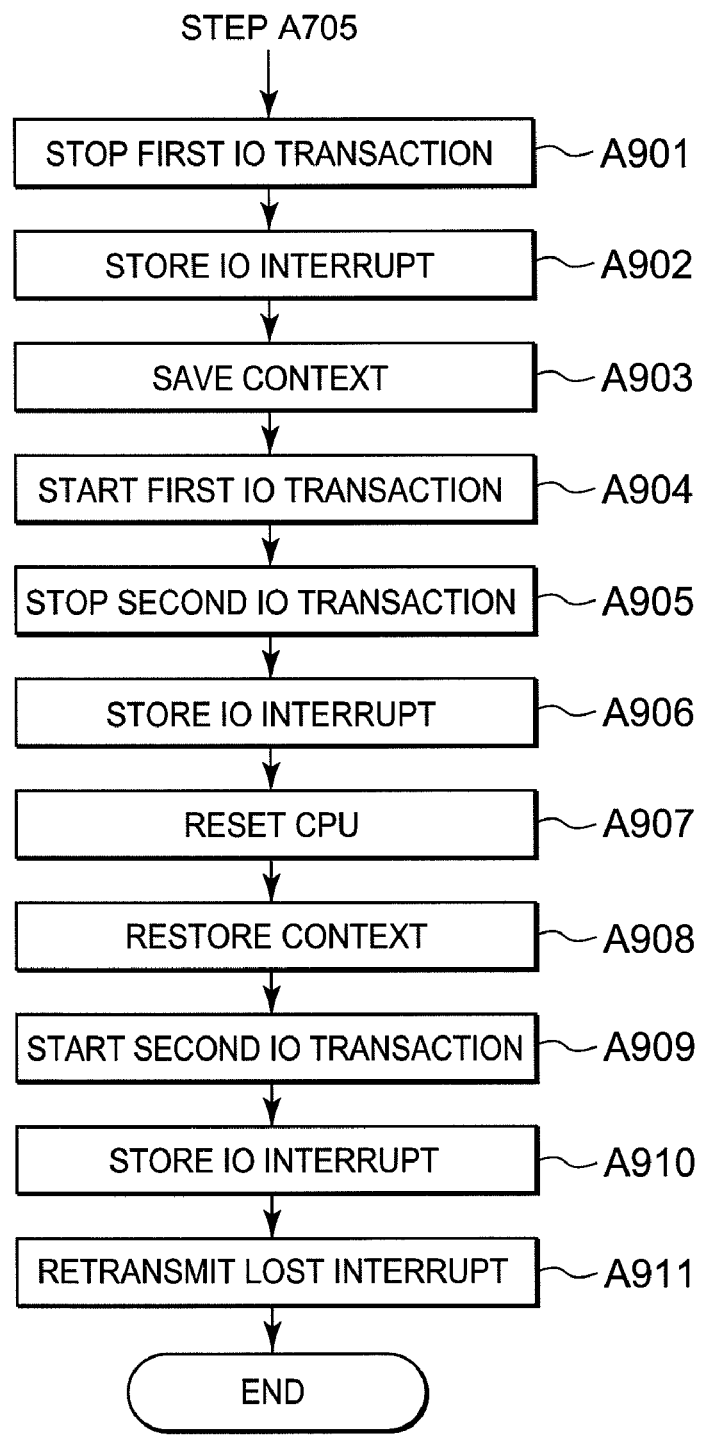
FIG. 7 is a diagram indicating the continuation of FIG. 5.
Figure 8:
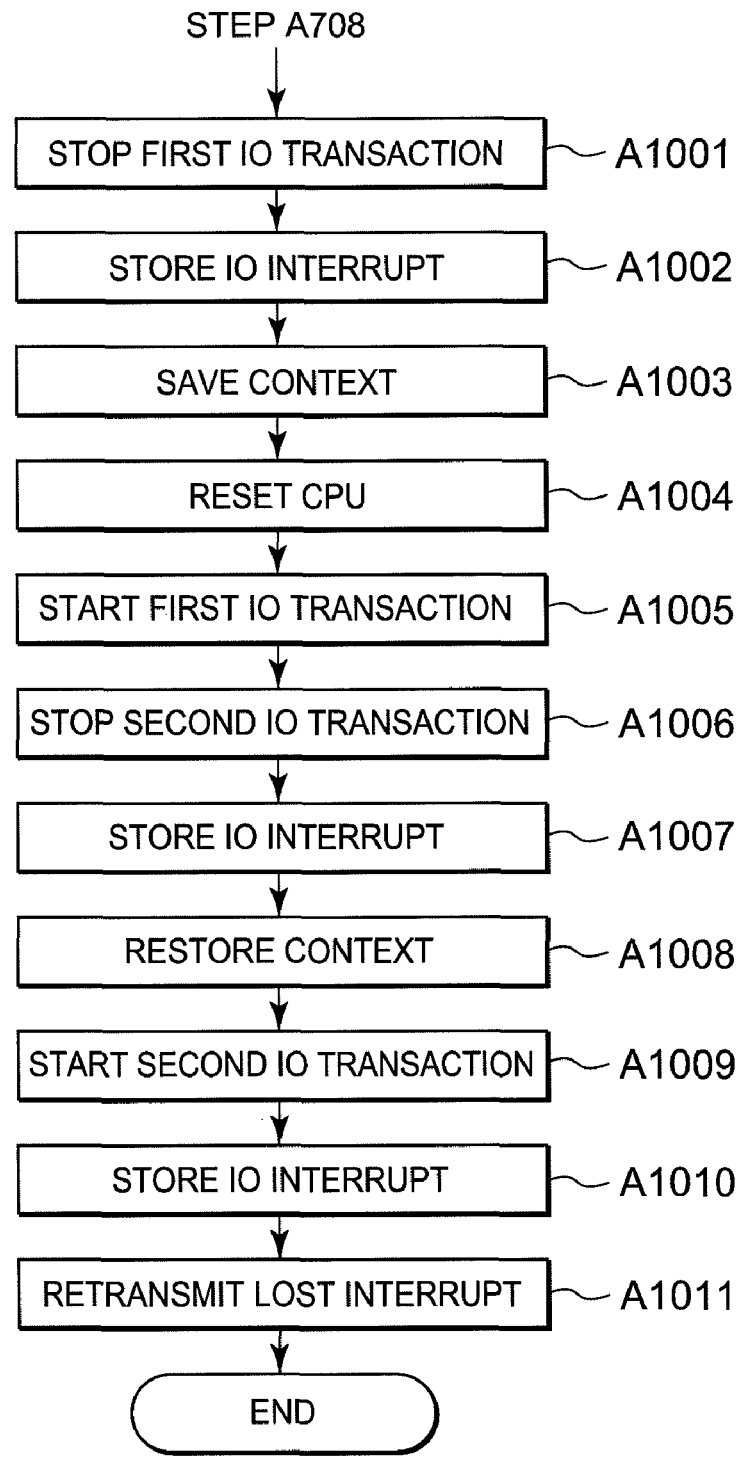
FIG. 8 is a diagram indicating the continuation of FIG. 5.
Figure 9:
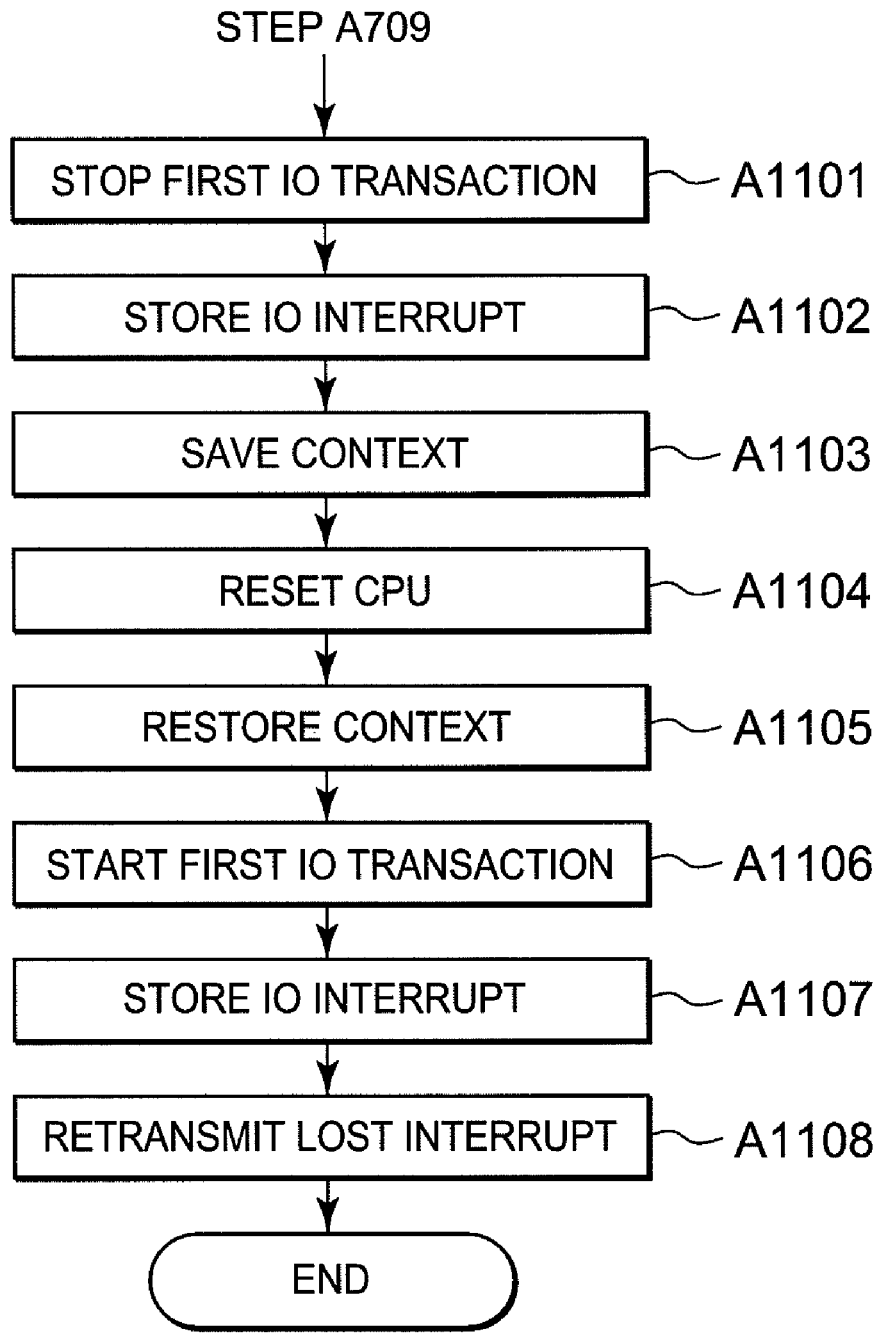
FIG. 9 is a diagram indicating the continuation of FIG. 5.

FIG. 6 is a flow indicating the continuation of step A704, and FIG. 7 is a flow indicating the continuation of step A705. Also, FIG. 8 is a flow indicating the continuation of step A708, and FIG. 9 is a flow indicating the continuation of step A709.

Since the difference between FIG. 5-8 and FIG. 2 is only order of the step, the detail explanation is omitted.

Figure 2:
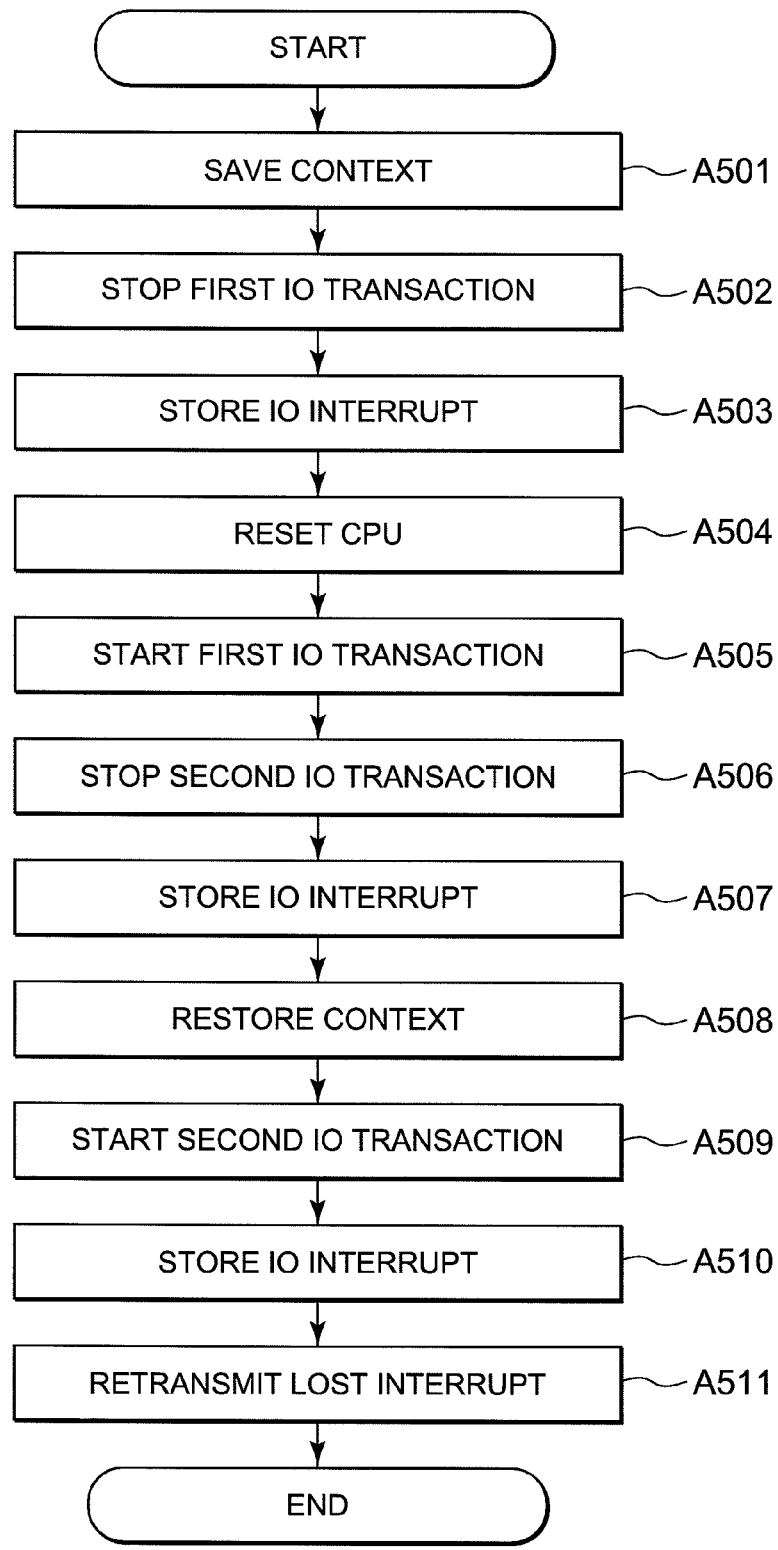
FIG. 2 is a diagram indicating g a basic operation.

Although, in this modified exemplary embodiment of the first exemplary invention, the context saving is done after the first transaction is stopped, the context saving can be done before the first transaction is stopped like FIG. 2. In this case, the IO transaction control unit determines only whether the IO transaction is divided at between the CPU reset and the context restoration or not based on the information necessary for the CPU reset and the context restoration.

Also, the completion timeout of the PCI Express is not limited to 50 ms in the first exemplary embodiment and the modified exemplary embodiment.

Also, the step where the IO interrupt is stored and the step where the IO interrupt is retransmitted can be omitted in the first exemplary embodiment and the modified exemplary embodiment.

Also, while embodiments have been disclosed using software units, the timeout preventing technique of this invention can be implemented using units of hardware. Alternatively, the timeout preventing device can be also realized by reading a program storing software units that include instructions causing a computer to execute the method from a computer readable recording medium, and executing the program by the computer.

Further, the above-described embodiment is a preferred embodiment of the present invention, however, the scope of the invention is not limited to only the above embodiment, but the invention can be implemented with various modifications without departing from the scope of the invention.

What is claimed is:

1. A timeout preventing device for preventing time out of an IO transaction during CPU re-initialization comprising:
   IO transaction control unit configured to stop and start an IO (Input/Output) transaction;
   context saving unit configured to save a register condition of a CPU;
   CPU resetting unit configured to reset the CPU after the context saving unit saves the register condition of the CPU; and
   context restoring unit configured to restore the register condition of the CPU to the condition saved by the context saving unit after the CPU resetting unit resets the CPU,
   wherein the IO transaction control unit controls the IO transaction so that the time when the IO transaction is continuously stopped during the CPU re-initialization process is within a predetermined time, that prevents complete time out of an interrupt of an IO transaction.

2. The timeout preventing device according to claim 1, wherein the IO transaction control unit determines whether the stop time is within the predetermined time or not, if the stop time is not within the predetermined time, the IO transaction control unit temporarily restarts and restops the IO transaction.

3. The timeout preventing device according to claim 2, wherein the IO transaction control unit determines whether the stop time is within the predetermined time or not according to a CPU resetting time information indicating a time necessary for resetting the CPU and a context restoring time information indicating a time necessary for restoring the register condition of the CPU saved by the context saving unit.

4. The timeout preventing device according to claim 3, further comprising:
   IO interrupt saving unit which saves a condition of an IO interrupt for the CPU; and
   IO interrupt retransmitting unit which retransmits the IO interrupt saved by the IO interrupt saving unit to the CPU,
   wherein the IO interrupt saving unit saves the IO interrupt occurring when the IO transaction is not stopped.

5. The timeout preventing device according to claim 4, wherein the IO interrupt saving unit saves the condition of the IO interrupt as a first IO interrupt information whenever the IO transaction control unit stops the transaction,
   wherein the IO interrupt saving unit saves the condition of the IO interrupt as a second IO interrupt information when the IO transaction control unit restarts the IO transaction, and
   wherein the IO interrupt retransmitting unit retransmits a third IO interrupt information indicating a difference between the first IO interrupt information and the second IO interrupt information.

6. The timeout preventing device according to claim 1, wherein the IO transaction control unit stops the IO transaction a first time after the context saving unit saves the register condition, the IO transaction control unit re-starts the IO transaction after the CPU resetting unit reset the CPU, the IO transaction control unit stops the IO transaction a second time after the IO transaction starting unit starts the IO transaction, and the IO control starting unit re-starts the IO transaction a second time after the context restoring unit restores the context.

7. The timeout preventing device according to claim 1, wherein the predetermined time is a time necessary for a completion timeout in a PCI (Peripheral Components Interconnect) Express card.

8. The timeout preventing device according to claims 1, wherein core level lockstep (CLL) is realized in a plurality of cores provided to the CPU, and the CPU is reset again in LoL (Loss of Lockstep) recovery which shifts from a non-lockstep mode to a lockstep mode,
   wherein the non-lockstep mode is a condition where two cores processes the same instruction sequence and compares the processing results, and
   wherein the lockstep mode is a condition where the non-lockstep mode is cancelled.

9. A timeout preventing method for preventing timeout of an IO transaction during CPU re-initialization, comprising:
   saving a register condition of a the CPU in a context saving step;
   resetting the CPU after the context saving step;
   restoring the register condition of the CPU saved in the context saving step,
   controlling the stopping and starting of the IO transaction so that the time during the CPU re-initialization when the IO transaction is continuously stopped before being restarted is within a predetermined time such that complete timeout of an interrupt of the IO transaction is prevented.

10. The timeout preventing method according to claim 9, further comprising:
    determining whether the stop time is within the predetermined time or not, if the stop time is not within the predetermined time, temporarily restarting and restopping the IO transaction during the CPU, re-initialization.

11. The timeout preventing method according to claim 10, wherein whether the stop time is within the predetermined time or not is determined, according to a CPU resetting time information indicating a time necessary for resetting the CPU and a context restoring time information indicating a time necessary for restoring the register condition of the CPU saved by the context saving unit.

12. The timeout preventing method according to claim 11, further comprising:
    saving a condition of an IO interrupt for the CPU in a IO interrupt saving step; and
    retransmitting the IO interrupt saved in the IO interrupt saving step to the CPU in a IO interrupt retransmitting step,
    wherein the IO interrupt occurring when the IO transaction is not stopped is saved in the IO interrupt saving step.

13. The timeout preventing method according to claim 12, wherein the condition of the IO interrupt is saved as a first IO interrupt information whenever the IO transaction control unit stops the transaction in the IO interrupt saving step, wherein the condition of the IO interrupt is saved as a second IO interrupt information when the IO transaction control unit restarts the IO transaction in the IO interrupt saving step, and wherein a third IO interrupt information indicating difference between the first IO interrupt information and the second IO interrupt information is retransmitted in the IO interrupt retransmitting step.

14. The timeout preventing method according to claim 9, wherein the IO transaction is stopped a first time after the context saving step and is re-started after the CPU resetting step, and the IO transaction is stopped a second time after the IO transaction is started and is re-started after the context restoring step.

15. The timeout preventing method according to claim 9, wherein the predetermined time is a time necessary for a completion timeout in a PCI (Peripheral Components Interconnect) Express card.

16. The timeout preventing method according to claim 9, wherein core level lockstep (CLL) is realized in a plurality of cores provided to the CPU, and the CPU is reset again in LoL (Loss of Lockstep) recovery which shifts from a non-lockstep mode to a lockstep mode, wherein the non-lockstep mode is a condition where two cores processes the same instruction sequence and compares the processing results, and wherein the lockstep mode is a condition where the non-lockstep mode is cancelled.

17. A computer readable medium recording thereon a program for enabling a computer which includes an IO transaction control unit to execute a timeout preventing method to prevent an IO transaction from timing out during a re-initialization of the CPU of the computer, comprising:

saving a register condition of a CPU in a context saving step stopping an IO transaction when the CPU is in re-initialization;

resetting the CPU after the context saving step; and restoring the register condition of the CPU saved in the context saving step after the CPU resetting step, controlling the IO transaction so that the time when the IO transaction is continuously stopped during CPU re-initialization is within a predetermined time such that complete timeout of an interrupt of the IO transaction is prevented.

18. The computer readable medium according to claim 17, wherein the controlling of the IO transaction continuous stop time further comprises:

determining whether the stop time is within the predetermined time or not, if the stop time is not within the predetermined time, the IO transaction control unit temporarily restarts restops the IO transaction.

19. The computer readable medium according to claim 18, wherein the controlling of the IO transaction continuous stop time further comprises:

determining whether the stop time is within the predetermined time or not, according to a CPU resetting time information indicating a time necessary for resetting the CPU and a context restoring time information indicating a time necessary for restoring the register condition of the CPU saved by the context saving unit.

20. The computer readable medium according to claim 19, further comprising:

saving a condition of an IO interrupt for the CPU in a IO interrupt saving step; and retransmitting the IO interrupt saved in the IO interrupt saving step to the CPU in a IO interrupt retransmitting step, wherein the IO interrupt occurring when the IO transaction is not stopped is saved in the IO interrupt saving step.

21. The computer readable medium according to claim 19, wherein the condition of the IO interrupt is saved as a first IO interrupt information whenever the IO transaction control unit stops the transaction in the IO interrupt saving step, wherein the condition of the IO interrupt is saved as a second IO interrupt information when the IO transaction control unit restarts the IO transaction in the IO interrupt saving step, and wherein a third IO interrupt information indicating difference between the first IO interrupt information and the second IO interrupt information is retransmitted in the IO interrupt retransmitting step.

22. The computer readable medium according to claim 17, wherein the IO transaction is stopped a fist time after the context saving step and is re-started after the CPU resetting step, and the IO transaction is stopped a second time after the IO transaction is started and is re-started after the context restoring step.

23. The computer readable medium according to claim 17, wherein the predetermined time is a time necessary for a completion timeout in a PCI (Peripheral Components Interconnect) Express card.

24. The computer readable medium according to claim 17, wherein core level lockstep (CLL) is realized in a plurality of cores provided to the CPU, and the CPU is reset again in LoL (Loss of Lockstep) recovery which shifts from a non-lockstep mode to a lockstep mode, wherein the non-lockstep mode is a condition where two cores processes the same instruction sequence and compares the processing results, and wherein the lockstep mode is a condition where the non-lockstep mode is cancelled.

25. A timeout preventing device for preventing an IO transact during CPU re-initialization comprising:

IO transaction control means for stopping and starting an IO (Input/Output) transaction;

context saving means for saving a register condition of a CPU;

CPU resetting means for resting the CPU during re-initialization after the context saving means saves the register condition of the CPU; and context restoring means for restoring the register condition of the CPU to the condition saved by the context saving unit after the CPU resetting means resets the CPU, wherein the IO transaction control means controls the IO transaction so that the time when the IO transaction is continuously stopped during the CPU re-initialization process is within a predetermined time, that prevents complete time out of an interrupt of an IO transaction such that the interrupt is not lost during CPU re-initialization.

26. The timeout preventing device according to claim 25, wherein the IO transaction control means including means for determining whether the stop time is within the predetermined time or not, and if the stop time is not within the predetermined time, temporarily restarting and restopping the IO transaction.

27. The timeout preventing device according to claim 26, wherein the IO transaction control means determines whether the stop time is within the predetermined time or not, according to a CPU resetting time information indicating a time necessary for resetting the CPU and a context restoring time information indicating a time necessary for restoring the register condition of the CPU saved by the context saving means.

28. The timeout preventing device according to claim 27, further comprising:
   IO interrupt saving means which saves a condition of an IO interrupt for the CPU; and
   IO interrupt retransmitting means which retransmits the IO interrupt saved by the IO interrupt saving means to the CPU,
   wherein the IO interrupt saving means saves the IO interrupt occurring when the IO transaction is not stopped.

29. The timeout preventing device according to claim 28,
   wherein the IO interrupt saving means saves the condition of the IO interrupt as a first IO interrupt information whenever the IO transaction control means stops the transaction,
   wherein the IO interrupt saving means saves the condition of the IO interrupt as a second IO interrupt information when the IO transaction control means restarts the IO transaction, and
   wherein the IO interrupt retransmitting means retransmits a third IO interrupt information indicating a difference between the first IO interrupt information and the second IO interrupt information.

30. The timeout preventing device according to claim 29,
   wherein the IO transaction stopping means stops the IO transaction a first time after the context saving means saves the register condition, the IO transaction starting means re-starts the IO transaction after the CPU resetting means rests the CPU, the IO transaction stopping means stops the IO transaction a second time after the IO transaction starting means starts the IO transaction, and the IO transaction starting means re-starts the second IO transaction after the context restoring means restores the context.

31. The timeout preventing device according to claim 25,
   wherein the predetermined time is a time necessary for a completion timeout in a PCI (Peripheral Components Interconnect) Express card.

32. The timeout preventing device according to claims 25,
   wherein core level lockstep (CLL) is realized in a plurality of cores provided to the CPU, and the CPU is reset again in LoL (Loss of Lockstep) recovery which shifts from a non-lockstep mode to a lockstep mode,
   wherein the non-lockstep mode is a condition where two cores processes the same instruction sequence and compares the processing results, and
   wherein the lockstep mode is a condition where the non-lockstep mode is cancelled.

* * * * *